US009055282B2

(12) United States Patent  
Inomoto

(10) Patent No.: US 9,055,282 B2  
(45) Date of Patent: Jun. 9, 2015

(54) 3D IMAGE PICKUP OPTICAL APPARATUS AND 3D IMAGE PICKUP APPARATUS

(71) Applicant: CANON KABUSHIKI KAISHA, Tokyo (JP)

(72) Inventor: Yu Inomoto, Saitama (JP)

(73) Assignee: CANON KABUSHIKI KAISHA (JP)

(*) Notice: Subject to any disclaimer, the term of this patent is extended or adjusted under 35 U.S.C. 154(b) by 408 days.

(21) Appl. No.: 13/677,552

(22) Filed: Nov. 15, 2012

(65) Prior Publication Data

US 2013/0127997 A1  May 23, 2013

(30) Foreign Application Priority Data

Nov. 17, 2011  (JP) .................. 2011-251462

(51) Int. Cl.
| | |
|---|---|
| *H04N 13/02* | (2006.01) |
| *G02B 13/16* | (2006.01) |
| *G02B 15/16* | (2006.01) |
| *G02B 15/173* | (2006.01) |
| *G02B 27/14* | (2006.01) |
| *G03B 35/10* | (2006.01) |

(52) U.S. Cl.
CPC ............... *H04N 13/02* (2013.01); *G02B 13/16* (2013.01); *G02B 15/16* (2013.01); *G02B 15/173* (2013.01); *G02B 27/14* (2013.01); *G03B 35/10* (2013.01); *H04N 13/021* (2013.01)

(58) Field of Classification Search
USPC ............ 348/46, 14.11, 44, 42, 49, 50, 54, 64, 348/135, 169, 174, 202, 208.11, 208.14, 348/208.16, 220.1, 222.1, 224.1, 333.01, 348/341, 344, 345, 360, 362, 370, 372, 705, 348/730, 756, 779, 781, 832; 359/19, 23, 359/355, 356, 378, 446, 642; 369/44.11, 369/44.37; 382/118, 140, 321
See application file for complete search history.

(56) References Cited

U.S. PATENT DOCUMENTS

| 3,690,772 A | * | 9/1972 | Endl .............................. 356/408 |
| 5,513,002 A | * | 4/1996 | Shapanus et al. ............. 356/313 |
| 5,671,450 A | | 9/1997 | Suzuki |
| 2006/0002247 A1 | * | 1/2006 | Kim et al. .................. 369/44.11 |
| 2006/0098114 A1 | * | 5/2006 | Horii .............................. 348/360 |
| 2010/0066890 A1 | * | 3/2010 | Ueda et al. ............... 348/333.02 |
| 2011/0050931 A1 | * | 3/2011 | Fujiyama et al. .......... 348/220.1 |

FOREIGN PATENT DOCUMENTS

| JP | 8036229 A | 2/1996 |
| JP | 2000152282 A | 5/2000 |

* cited by examiner

*Primary Examiner* — Jefferey Harold  
*Assistant Examiner* — Mustafizur Rahman  
(74) *Attorney, Agent, or Firm* — Rossi, Kimms & McDowell LLP

(57) ABSTRACT

An optical apparatus used for a 3D image pickup apparatus for taking two subject images having a disparity by using two lens apparatuses, each of which is directly connectable to an image pickup apparatus, and one image pickup apparatus, the optical apparatus including: a first attaching unit for detachably attaching a first lens apparatus; a second attaching unit for detachably attaching a second lens apparatus; a camera attaching unit for detachably attaching the image pickup apparatus, the image pickup apparatus including an image pickup portion; and a switch unit for alternately switching light rays from the first and second lens apparatuses to guide the light ray to the image pickup apparatus in a state that the first and second lens apparatuses and the image pickup apparatus are connected to the optical apparatus. Intermediate images are formed in the optical apparatus by the first and second lens apparatuses.

7 Claims, 8 Drawing Sheets

3D IMAGE PICKUP OPTICAL APPARATUS AND 3D IMAGE PICKUP APPARATUS

BACKGROUND OF THE INVENTION

1. Field of the Invention

The present invention relates to an optical apparatus used for a 3D image pickup apparatus using a digital camera, a video camera, a broadcasting camera, or the like. In particular, the present invention relates to an optical apparatus used for the 3D image pickup apparatus capable of taking left and right (two) subject images having a disparity using two exchangeable lenses which are directly connected to the image pickup apparatus and capable of taking a subject image and the one image pickup apparatus, and to the 3D image pickup apparatus including the optical apparatus.

2. Description of the Related Art

Conventionally, there are proposed various image pickup apparatus for taking left and right subject images having a disparity so as to be viewed as a 3D image.

Japanese Patent Application Laid-Open No. H08-36229 discloses a proposal of an adapter that is attached to an object side of one image pickup lens so as to take left and right subject images having a disparity. In addition, Japanese Patent Application Laid-Open No. 2000-152282 discloses a proposal of a lens dedicated for 3D photography for taking subject images having a disparity.

In order to produce an image in accordance with an intention of photography, multiple image pickup lenses having different specifications are required. The above-mentioned conventional technologies disclosed in Japanese Patent Application Laid-Open No. H08-36229 and in Japanese Patent Application Laid-Open No. 2000-152282 have a problem that it is necessary to prepare multiple lenses dedicated for 3D photography or to prepare adapters dedicated for the individual lenses. In addition, the above-mentioned adapter has a problem that it is necessary to use an extremely large mirror disposed on the object side of the image pickup lens particularly for a wide angle image pickup lens to cover the angle of view necessary for photography.

SUMMARY OF THE INVENTION

The present invention provides a lens adapter for 3D photography having a small and simple structure, capable of saving time and effort to prepare multiple lenses dedicated for 3D photography or adapters dedicated for individual lenses, and capable of using an exchangeable lens unit meeting a lens mount standard for general photography.

According to an embodiment of the present invention, an optical apparatus used for a 3D image pickup apparatus, for taking two subject images having a disparity by using two lens apparatuses, each of which is directly connectable to an image pickup apparatus to take a subject image, and one image pickup apparatus, includes a first lens attaching unit for attaching a first lens apparatus in a detachable manner, a second lens attaching unit for attaching a second lens apparatus in a detachable manner, a camera attaching unit for attaching the image pickup apparatus in a detachable manner, the image pickup apparatus including an image pickup portion, and a switch unit for alternately switching light rays from the first lens apparatus and the second lens apparatus in a time division manner to guide the light ray to the image pickup apparatus in a state that the first lens apparatus, the second lens apparatus and the image pickup apparatus are connected to the optical apparatus, in which intermediate images of a subject are formed in the optical apparatus by the first lens apparatus and the second lens apparatus.

Further features of the present invention will become apparent from the following description of exemplary embodiments with reference to the attached drawings.

DESCRIPTION OF THE EMBODIMENTS

Figure 1:
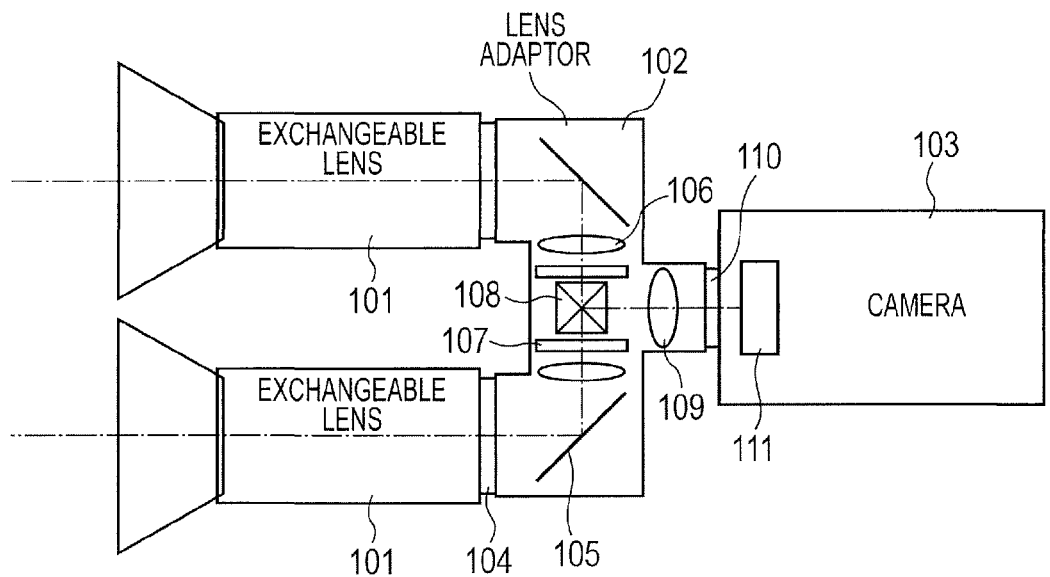
FIG. 1 is a schematic diagram illustrating a structure of a 3D image pickup apparatus according to the present invention.

Exemplary embodiments of the present invention are hereinafter described in detail with reference to the attached drawings. FIG. 1 is a schematic diagram of a 3D image pickup apparatus according to the embodiments of the present invention.

Embodiment 1

With reference to FIG. 1, a schematic structure of a 3D image pickup apparatus according to Embodiment 1 of the present invention is hereinafter described.

The 3D image pickup apparatus of the present invention for taking two subject images having a disparity includes two lens apparatus and one image pickup apparatus, in which the lens apparatus as exchangeable lenses can be directly connected to the image pickup apparatus for taking the subject images, and an optical apparatus (a lens adapter) disposed between the exchangeable lens and the image pickup apparatus. The 3D image pickup apparatus includes left and right (two) exchangeable lenses 101 (a first lens apparatus and a second lens apparatus) for taking subject images having a disparity, a lens adapter 102 as an optical apparatus for combining the left and right images, and an image pickup camera 103 of a lens exchangeable type. Attaching members 104 as units for attaching the exchangeable lenses in a detachable manner (a first lens attaching unit and a second lens attaching unit) constitute a part of the lens adapter 102. A reflective member 105 for deflecting an optical axis (a first reflective member) is formed of a total reflection mirror, a prism, or the like. The lens adapter 102 includes lens units (first lens units) 106 and a switch member 107 as a unit for alternately switching and transmitting the left and right images by time division such as a liquid crystal shutter or a mechanical shutter. A reflective member 108 (a second reflective member) deflects the optical axis so as to deflect the optical axes of the left and right subject images to become the same optical axis after the deflection. The reflective member 108 is formed of a polarization beam splitter prism, a half-mirror prism, or the like. A lens unit 109 (a second lens unit) and an attaching member 110 as a unit for attaching the camera in a detachable manner (a camera attaching unit) constitute a part of the lens adapter 102. An image pickup portion 111 is formed of an image pickup system of a single-image-pickup-device type or a multi-image-pickup-device type including a color splitting optical system. A CCD, A CMOS image sensor, an image pick-up tube, and the like can be adopted as an image pickup element.

In an actual image-taking, it is necessary to drive the switch member 107 to alternately transmit the light rays of the left and right subject images in a time division manner, and to guide the individual light rays independently to the image pickup element 111. The image pickup element of the camera as the image pickup apparatus alternately receives subject images from the left and right exchangeable lenses in a time division manner. The lens adapter 102 outputs a switch timing signal for the switch member 107, and the output switch timing signal is used for discriminating which one of the left and right exchangeable lenses the taken subject image comes from when the taken image is displayed on a display device or when the image is stored in a storage device.

A specific structure and an operation procedure in a case where the switch member is a liquid crystal shutter are hereinafter described. In this case, it is preferred to perform a drive control so that polarized states of the transmitted light rays are orthogonal to each other. In the following description, it is supposed that the right transmitted light ray is s-polarized light, while the left transmitted light ray is p-polarized light.

Figure 12:
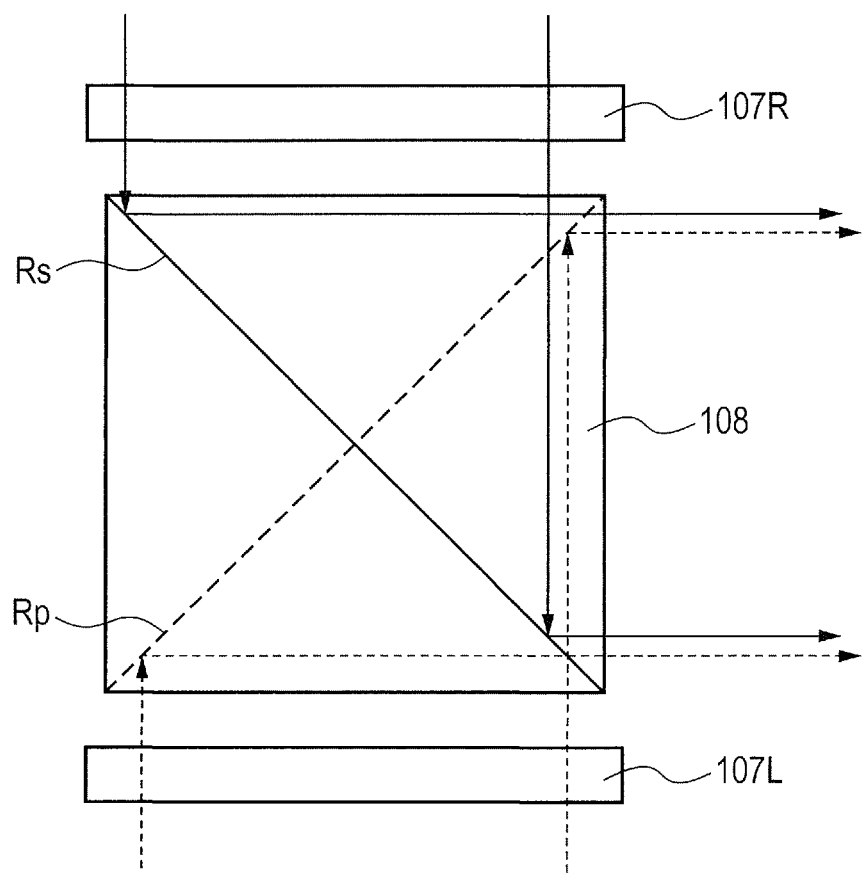
FIG. 12 is a schematic diagram of a liquid crystal shutter and a polarization beam splitter.

FIG. 12 is a schematic diagram illustrating the liquid crystal shutter as the switch member 107 and the polarization beam splitter as the reflective member 108. A liquid crystal shutter 107R allows the right light ray as the s-polarized light to transmit or cuts off the right light ray, and a liquid crystal shutter 107L allows the left light ray as the p-polarized light to transmit or cuts off left light ray. The polarization beam splitter prism is denoted by 108. In the polarization beam splitter prism 108, a surface Rs reflects only the s-polarized light, and a surface Rp reflects only the p-polarized light. In other words, the right light ray as the s-polarized light after passing through the liquid crystal shutter 107R (illustrated by a solid line arrow) is reflected only by the surface Rs, while the left light ray as the p-polarized light after passing through the liquid crystal shutter 107L (illustrated by a dotted line arrow) is reflected only by the surface Rp. In this case, it is preferred to perform the operation of transmitting the right light ray and simultaneously cutting off the left light ray in even (odd) frames, while transmitting the left light ray and simultaneously cutting off the right light ray in odd (even) frames. With the structure described above, the left and right subject images can be alternately guided to the image pickup element 111.

As described above, by disposing the lens adapter between the exchangeable lens and the image pickup camera, it is possible to provide the lens adapter that can be shared for various specifications of exchangeable lens units having the same lens mount. Thus, it is possible to save time and effort to prepare multiple lenses dedicated for 3D photography or the adapters dedicated for the individual lenses unlike the conventional technologies.

Figure 2:
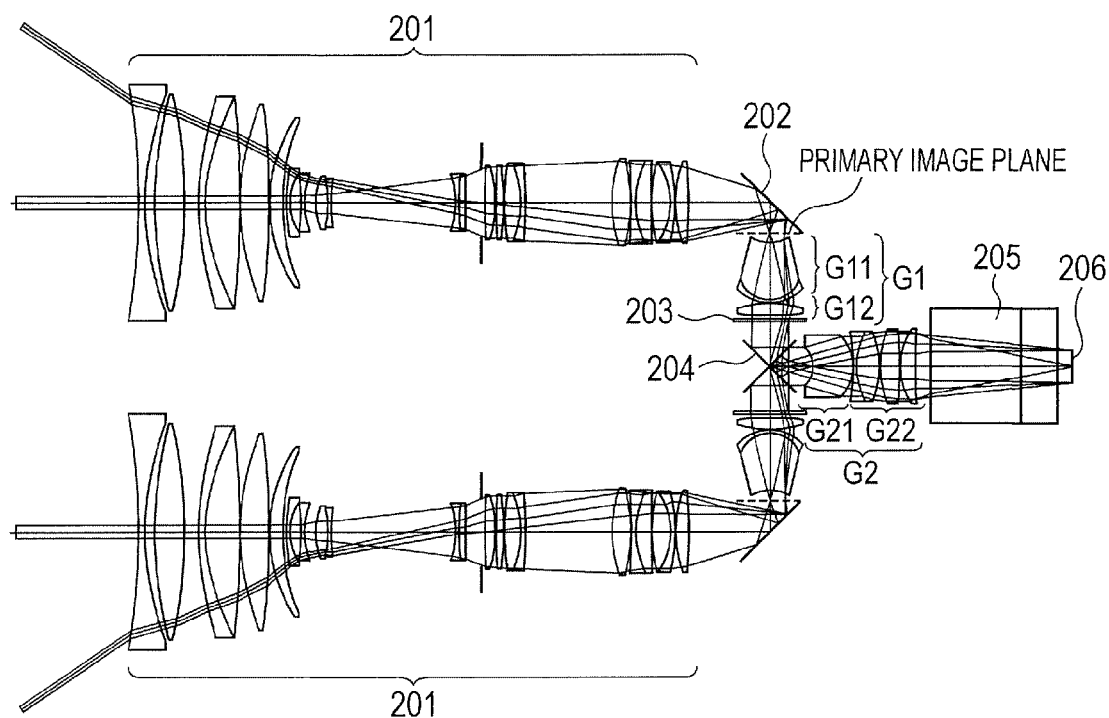
FIG. 2 is an optical path diagram when focusing at infinity at a wide angle end in a lens system according to Embodiment 1 of the present invention.

With reference to FIG. 2, a detailed structure of the lens adapter 102 according to Embodiment 1 of the present invention is hereinafter described.

The 3D image pickup apparatus includes exchangeable lenses 201, left and right (two systems of) first reflective members 202 for deflecting optical axes, left and right (two systems of) first lens units G1 having a positive refractive power, and left and right (two systems of) shutters 203 as units for alternately transmitting the left and right subject images by switching in a time division manner. However, the shutter 203 may be disposed in front of or behind the first reflective member 202 and the first lens unit G1 or may be disposed in the lens unit. A second reflective member 204 deflects the optical axes so that the optical axes of the left and right subject images become the same optical axis. A second lens unit G2 having a positive refractive power is shared by the left and right lens systems. The 3D image pickup apparatus also includes a color splitting optical system 205 and an image pickup plane 206.

Further, the first lens unit G1 includes, in order from the object side, a lens unit G11 (referred to also as a G11 unit) and a lens unit G12 (referred to also as a G12 unit). The lens unit G11 is a cemented lens including one positive lens and one negative lens, and the lens unit G12 has a positive refractive power. Similarly, the second lens unit G2 includes, in order from the object side, a lens unit G21 (referred to also as a G21 unit) and a lens unit G22 (referred to also as a G22 unit). The lens unit G21 is a single lens, and the lens unit G22 is a lens unit having a positive refractive power.

When a primary image plane of the exchangeable lens illustrated by a dotted line in FIG. 2 is positioned on a surface of the first reflective member 202 or inside the first lens unit G1, image-formed light from the subject may irradiate dust on a reflection surface or a defect inside glass and cause a secondary light source so that undesired light may enter the image pickup plane. Therefore, it is preferred that the primary image plane be positioned in an air interval between the first reflective member 202 and the first lens unit G1, or the like.

In addition, the primary image plane of the exchangeable lens is included in the lens adapter (an intermediate image of the subject is formed inside the lens adapter 102), and the image pickup element is in a state of secondary imaging. Therefore, the subject image is reversed in up and down as well as in left and right in comparison to the normal photography. Therefore, it is preferred that the lens adapter of the present invention include a transmission unit for transmitting a signal to the camera, indicating that the lens adapter is attached, and it is preferred that the camera include a reception unit for receiving the signal and a reversing function for reversing the image sent out to the display device in up and down as well as left and right to be the same as the normal.

In order to reduce a light intensity drop of a solid-state image pickup element such as a CCD or white shading in the color splitting optical system, it is preferred that the exchangeable lens be an image side telecentric optical system by setting an exit pupil position distant from the image pickup surface 206. In this case, it is preferred that the entire optical system via the lens adapter of the present invention also have a structure for setting the exit pupil position distant from the image pickup surface similarly to the exchangeable lens.

As to the image pickup apparatus such as a single lens reflex camera or a camera having the color splitting optical system, the exchangeable lens is required to have a relatively long back focus. In this case, it is also preferred that the lens adapter of the present invention also have a relatively long back focus.

In the 3D image photography, it is desired to have a convergence angle changing mechanism for changing a convergence angle between the left and right exchangeable lenses in accordance with a subject distance. As the convergence angle changing mechanism, for example, it is possible to have a mechanism for changing the convergence angle by changing attaching angles of the left and right exchangeable lenses 201 to the lens adapter in the opposite directions so that the optical axis angles of the left and right exchangeable lenses 201 are changed by the same degrees in the opposite directions, and changing the angles of the first reflective members 202 in accordance with the change of the above-mentioned attaching angles.

Alternatively, without providing the structure of the lens adapter in which the attaching angles of the exchangeable lenses 201 can be changed, it is possible to adopt a structure in which at least one lens in each of the first lens units G1 is driven in a plane perpendicular to the optical axis so that the lenses move by the same amount in the opposite directions with respect to the optical axis. In other words, it is possible to adopt a structure in which, in order to tilt the optical axes of the left and right exchangeable lenses 201 in the opposite directions in the plane including the optical axes of the left and right exchangeable lenses 201 (the first lens apparatus and the second lens apparatus), at least one lens in each of the first lens units G1 of the left and right exchangeable lenses 201 is moved by the same amount in the opposite directions with respect to the optical axis. Here, the optical axis means an optical path of a light ray passing through the center of the aperture stop to enter the center of the image pickup element, in other words, an optical path of a principal ray of the light ray entering the center of the image pickup element.

In this structure, the image forming positions of the subject image on the image planes by the left and right exchangeable lenses 201 are moved in the opposite directions along the direction connecting the optical axes of the left and right exchangeable lenses 201. Therefore, when the taken images are displayed as images for left and right eyes of the 3D image, it is possible to realize a pseudo state in which the 3D image is taken by changing the convergence angle. Note that, to move at least one lens each in the first lens units G1 in the plane perpendicular to the optical axis so that the lenses move in the opposite directions with respect to the optical axis direction means, for example, to move the at least one lenses each of which corresponds to a lens of the left and right exchangeable lenses 201 so that the lenses move in the opposite directions along the direction connecting the optical axes of the left and right exchangeable lenses when viewing the at least one lens in each of the first lens units G1 from the object side toward the image side along the optical axis. In addition, it means in the lens adapter illustrated in FIG. 1 that the lenses in the first lens units 106 corresponding to the left and right exchangeable lenses are both moved to the camera side (the right side in the diagram) or to the object side (the left side in the diagram).

The lens adapter having the above-mentioned structure satisfies the value range defined by the following conditional expression (1):

$$0.90 < f1/f2 < 1.30 \quad (1),$$

where f1 represents a focal length of the first lens unit G1, f2 represents a focal length of the second lens unit G2, and the conditional expression (1) defines a value range of a ratio between the focal lengths of the lens units.

When the lower limit of the conditional expression (1) is not satisfied because f1 is too small with respect to f2, it becomes difficult to maintain the exit pupil position at a distant position from the image pickup plane while maintaining good optical performance. In addition, it becomes difficult to downsize the lens because the diameter of the second lens unit is increased. On the contrary, when the upper limit of the conditional expression (1) is not satisfied because f1 is too large with respect to f2, it becomes difficult to secure a relatively long back focus while maintaining good optical performance.

Further, it is more preferred to satisfy the following conditional expression.

$$0.98 < f1/f2 < 1.22 \quad (1a)$$

The above-mentioned lens adapter satisfies the value range defined by the following conditional expression (2):

$$-0.20 < 1/SF11 < 0.40 \quad (2),$$

where SF11 represents a shape factor SF of the G11 unit. The shape factor SF of a certain lens unit is defined by the following expression:

$$SF = (R2 + R1)/(R2 - R1),$$

where R1 represents a curvature radius of the optical surface closest to the object side in the lens unit, and R2 represents a curvature radius of the optical surface closest to the image side in the lens unit.

In order to set the exit pupil position of the entire system including the exchangeable lens and the lens adapter at a distant position from the image pickup surface, it is necessary to set the exit pupil position via the first lens unit G1 in a vicinity of a position distant from the front principal point position of the second lens unit G2 to the object side by the focal length f2 of the second lens unit G2 (in air; hereinafter referred to as a front focal position).

On the other hand, as apparent from FIG. 2 too, in order to avoid physical interference between the left and right exchangeable lenses, it is required at least to set a space between the first reflective member 202 and the second reflective member 204 to be larger than a lens width. Therefore, a space between the first lens unit G1 and the second lens unit G2 is also increased.

In this case, in order to set the exit pupil position via the first lens unit G1 in a vicinity of the front focal position of the second lens unit G2, it is preferred to constitute the entire first lens unit G1 as a retrofocus type lens.

Figure 10A:
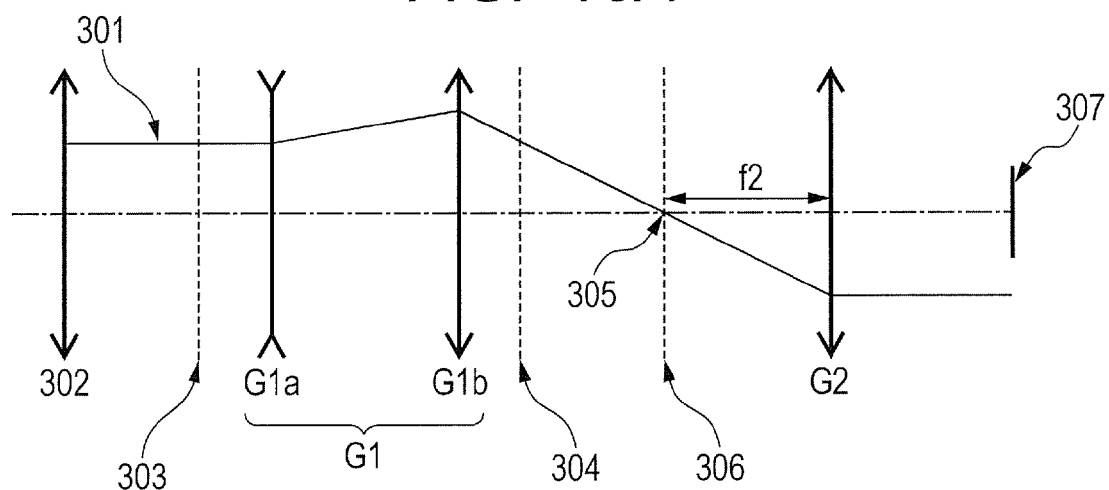
FIG. 10A is a schematic diagram of a lens configuration for setting an exit pupil position at a distant position.
Figure 10B:
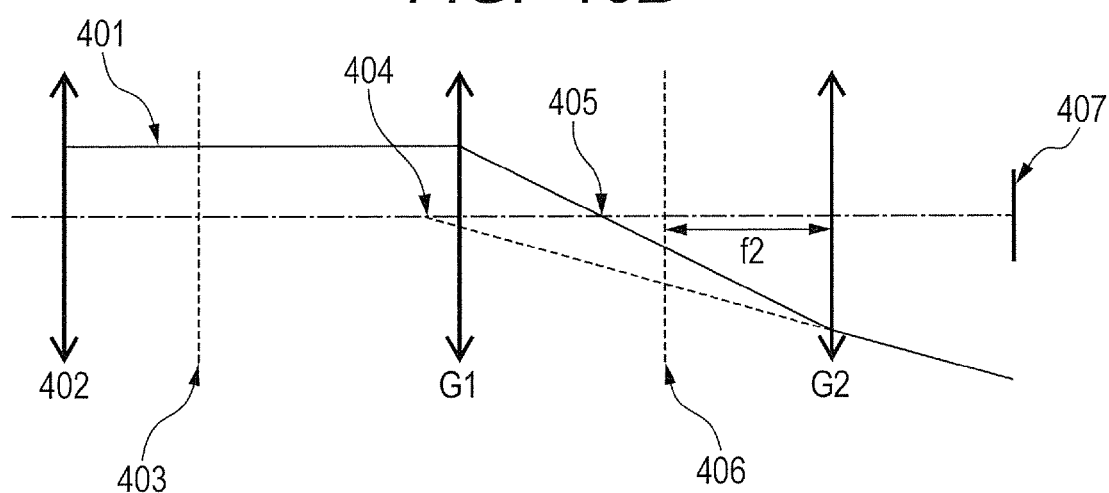
FIG. 10B is a schematic diagram of the exit pupil position in a simple lens configuration.

With reference to FIGS. 10A and 10B, the above-mentioned reason is hereinafter described in detail.

FIG. 10B is a schematic diagram schematically illustrating a case of a lens adapter in which the first lens unit G1 has a simple positive refractive power unlike this example, in the case where the space between the first lens unit G1 and the second lens unit G2 is large as described above.

A straight line 401 is a paraxial off-axis ray. The light ray 401 is image side telecentric on a paraxial image plane 403 of an exchangeable lens 402. Therefore, the light ray 401 enters the first lens unit G1 of the lens adapter optical system in parallel, is refracted by the first lens unit G1, and further is refracted by the second lens unit G2 afterward so as to reach an image pickup surface 407.

However, because the space between the first lens unit G1 and the second lens unit G2 is large so that an exit pupil position 405 via the first lens unit G1 is positioned closer to the object side with respect to a front focal position 406 of the second lens unit G2. Therefore, an exit pupil position 404 of the entire system is positioned in a vicinity of the image pickup surface as illustrated in the diagram.

On the other hand, FIG. 10A is a schematic diagram briefly illustrating a lens layout in Embodiment 1. This is different from FIG. 10B in that the internal structure of the first lens unit G1 includes, in order from the object side, a lens unit G1a having a negative refractive power and a lens unit G1b having a positive refractive power, and hence the entire first lens unit G1 constitutes a retrofocus type lens.

With this structure, a rear principal point position 304 of the first lens unit G1 is pushed to the image side, and an exit pupil position 305 via the first lens unit G1 can be set to a position of a front focal position 306 of the second lens unit G2. Therefore, as illustrated in FIG. 10A, the exit pupil position of the entire system can be set to a position sufficiently distant from the image pickup surface.

In Embodiment 1, in order to achieve the above-mentioned condition most effectively, a negative refractive power surface is positioned closest to the object side and a positive refractive power surface is positioned closest to the image side in the lens unit G11. In the above-mentioned structure of the retrofocus type lens unit, the reciprocal of the shape factor is apt to have a small value. Therefore, in the present invention, a preferred value range of the reciprocal of the shape factor $1/SF11$ expressed by the conditional expression (2) is defined.

When the lower limit of the conditional expression (2) is not satisfied, it becomes difficult to maintain the exit pupil position distant from the image pickup surface while maintaining good optical performance. In addition, the exit pupil position via the first lens unit G1 cannot be maintained at the above-mentioned appropriate position but is positioned closer to the object side. Therefore, the diameter of the second lens unit is increased so that it becomes difficult to downsize the lens. On the other hand, when the upper limit of the conditional expression (2) is not satisfied, it becomes difficult to maintain the exit pupil position distant from the image pickup surface while maintaining good optical performance. In addition, the exit pupil position of the first lens unit G1 cannot be maintained at the above-mentioned appropriate position but is positioned closer to the image side. Therefore, the second lens unit is inevitably positioned to the rear so that the entire length becomes long. As a result, it becomes difficult to downsize the lens.

Further, it is more preferred to satisfy the following expression.

$$-0.14<1/SF11<0.33 \qquad (2a)$$

In this Embodiment, the G11 unit is formed of a cemented lens including, in order from the object side, one positive lens and one negative lens. However, the present invention is not limited to this structure. The effect of the present invention can be obtained by adopting a structure in which the G11 unit is formed of a single lens or a cemented lens including, in order from the object side, at least one positive lens and at least one negative lens, so as to satisfy the conditional expression (2) or (2a).

The above-mentioned lens adapter satisfies the value range defined by the following conditional expression (3):

$$0.00<1/SF21<0.40 \qquad (3),$$

where, SF21 represents a shape factor of the G21 unit.

In order to secure a relatively long back focus of the lens adapter, it is preferred to adopt the retrofocus type lens configuration as the entire second lens unit G2.

The above-mentioned reason is hereinafter described in detail with reference to FIGS. 11A and 11B.

Figure 11A:
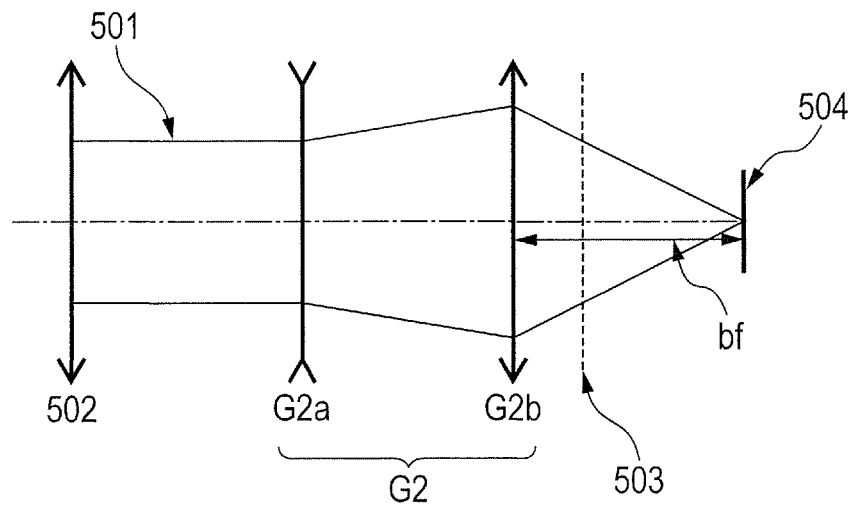
FIG. 11A is a schematic diagram of a lens configuration for securing a relatively long back focus.
Figure 11B:
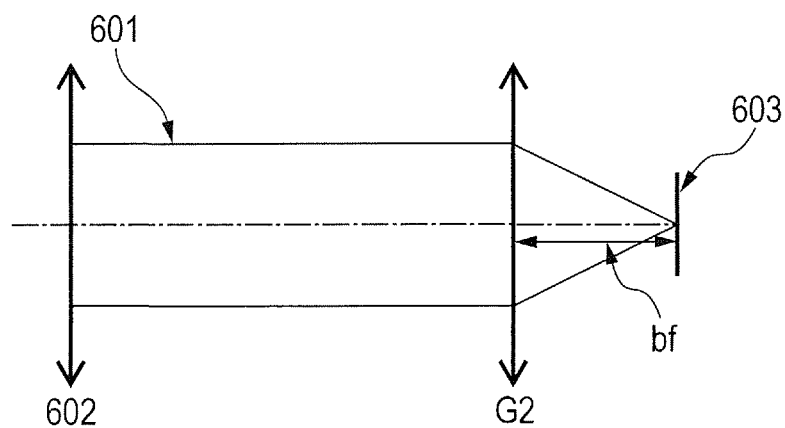
FIG. 11B is a schematic diagram illustrating a back focus secured in the simple lens configuration.

FIG. 11B is a schematic diagram briefly illustrating a case where the second lens unit G2 having a positive refractive power has a simple structure having a positive refractive power. A straight line 601 is a paraxial axial ray. An exchangeable lens and the G1 unit are denoted by reference numeral 602, and an image pickup surface is denoted by reference numeral 603. In addition, the back focus is denoted by bf.

On the other hand, FIG. 11A is a schematic diagram briefly illustrating a lens layout according to Embodiment 1. A straight line 501 is a paraxial axial ray, an exchangeable lens and the G1 unit are denoted by reference numeral 502, a rear principal point position of the second lens unit G2 is denoted by reference numeral 503, and an image pickup surface is denoted by reference numeral 504.

Further, an internal structure of the second lens unit G2 having a positive refractive power as a whole includes, in order from the object side, a lens unit G2a having a negative refractive power and a lens unit G2b having a positive refractive power so as to constitute a retrofocus type lens configuration as the entire second lens unit G2. With this structure, the rear principal point position 503 of the second lens unit G2 is pushed to the image side, and it is understood that the back focus bf can be secured to be relatively long compared with the structure of FIG. 11B.

In Embodiment 1, in order to achieve the above-mentioned condition most effectively, a surface having a negative refractive power in the lens unit G21 is disposed closest to the object side, and a surface having a positive refractive power is disposed closest to the image side. In the present invention, for the exact same reason as described above for the conditional expression (2), a preferred value range of the reciprocal of the shape factor $1/SF21$ expressed by the conditional expression (3) is defined.

When the lower limit of the conditional expression (3) is not satisfied, it becomes difficult to secure a necessary back focus while maintaining good optical performance. When the upper limit of the conditional expression (3) is not satisfied, the diameter of the second lens unit is increased so that it becomes difficult to downsize the lens.

Further, it is more preferred to satisfy the following expression.

$$0.05<1/SF21<0.34 \qquad (3a)$$

In this Embodiment, the case where the G21 unit is formed of a single lens is described, but the present invention is not limited to this structure. It is possible to obtain the effect of the present invention by adopting a structure in which the G21 unit is formed of a single lens or a cemented lens including, in order from the object side, at least one positive lens and at least one negative lens, so as to satisfy the conditional expression (3) or (3a).

By satisfying the above-mentioned apparatus structure and the conditional expression, Embodiment 1 of the present invention can provide a lens adapter for 3D photography having a small and simple structure, which can be shared for exchangeable lens units having the same lens mount and various specifications.

Figure 3A:
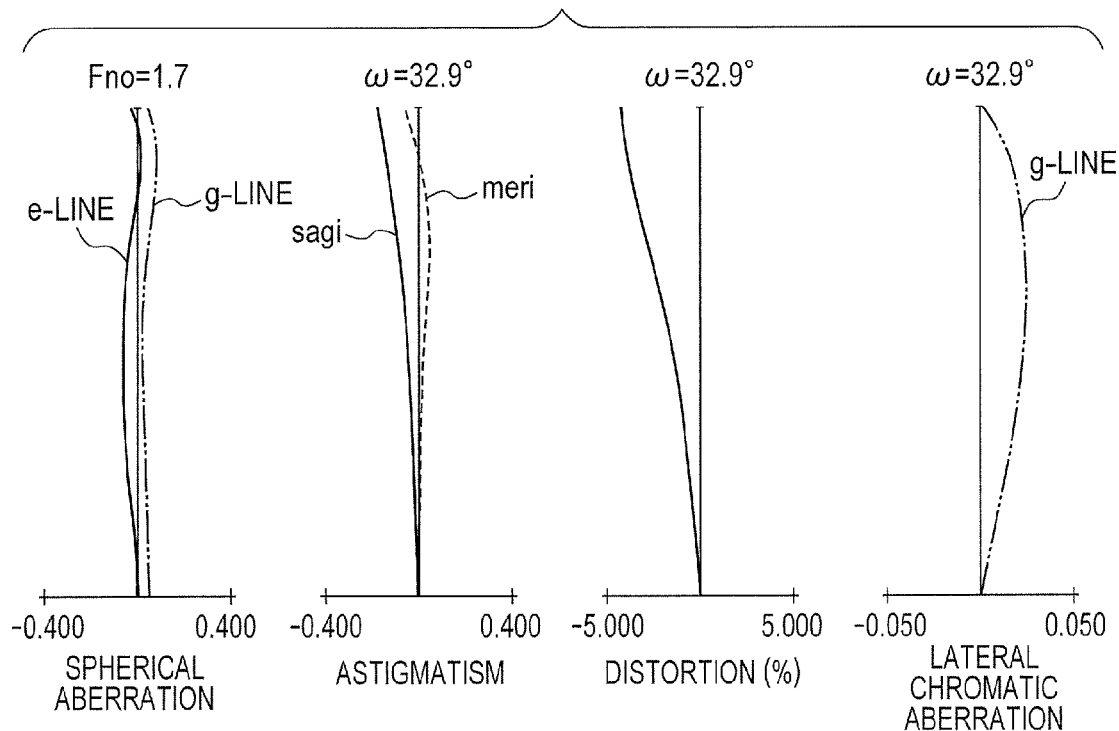
FIG. 3A is an aberration diagram when focusing at 3 meters at the wide angle end in the lens system according to Embodiment 1.
Figure 3B:
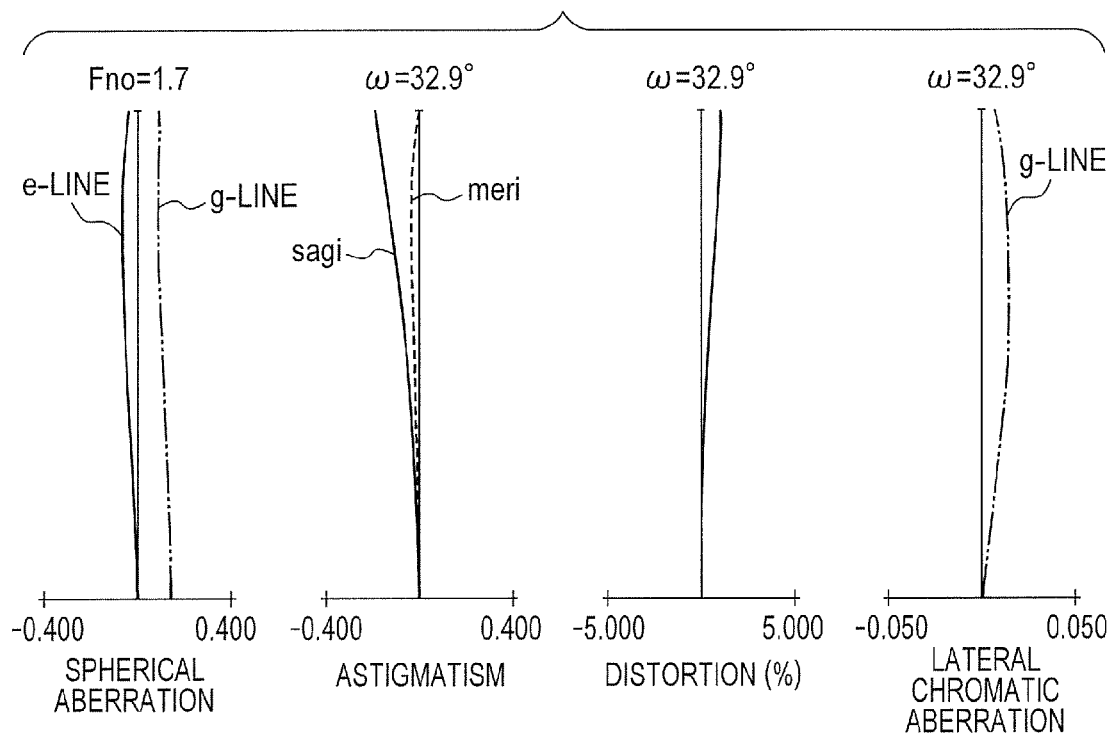
FIG. 3B is an aberration diagram when focusing at 3 meters at a telephoto end in the lens system according to Embodiment 1.

FIG. 2 is an optical path diagram of the lens system according to Embodiment 1 of the present invention when focusing on an object at infinity at a wide angle end. In addition, optical numerical data corresponding to Embodiment 1 is shown in Numerical Embodiment 1. In numerical data of Numerical Embodiment, a surface number indicates the i-th optical surface from the object side, r represents a curvature radius of the i-th optical surface, d represents a space between the i-th and (i+1)th optical surfaces, nd represents a refractive index of a medium between the i-th and (i+1)th optical surfaces, vd represents an Abbe number of the medium between the i-th and (i+1)th optical surfaces, and an effective diameter indicates an effective diameter of an optical element between the i-th and (i+1)th optical surfaces. The same is true in the following Numerical Embodiments 2 to 4. FIG. 3A is a longitudinal aberration diagram when focusing on a subject at a subject distance of 3 meters at the wide angle end in Embodiment 1. FIG. 3B is a longitudinal aberration diagram when focusing on a subject at a subject distance of 3 meters at a telephoto end in Embodiment 1. Spherical aberration is illustrated in scale of 0.4 mm, astigmatism is illustrated in scale of 0.4 mm, distortion is illustrated in scale of 5%, and lateral chromatic aberration is illustrated in scale of 0.05 mm. Note that, the scale of the aberration diagram is the same also in the following embodiments.

In Numerical Embodiment 1 corresponding to Embodiment 1, the focal lengths of the individual lens units and values of the curvature radius are substituted into the conditional expressions (1) to (3). Then, the values in the field of Embodiment 1 of Table 1 are obtained, and all the conditional expressions are satisfied. In addition, the conditional expressions (1a), (2a), and (3a) defining more preferred value ranges are also satisfied. Thus, Embodiment 1 realizes a compact lens adapter in which the exit pupil position is positioned distant from the image pickup surface while maintaining good optical performance so that a relatively long back focus is secured. Note that, the back focus as used herein is defined as a sum of surface spaces from the 59th to 61st surfaces in Numerical Embodiment 1 and a value of BF, and the same definition is used also in the following Embodiments.

In addition, in the 3D image pickup apparatus, a stereoscopic effect when viewing a 3D image can be changed by changing a distance D between the optical axes of the left and right lenses. A human binocular interval (the distance between the optical axes) is approximately 65 mm. When the distance between the optical axes is larger than 65 mm, the stereoscopic effect when viewing the 3D image is exaggerated than in reality. In the opposite condition, the stereoscopic effect is felt smaller than in reality. In Embodiment 1, the distance between the optical axes is set larger than the human binocular disparity, namely D=120 mm.

Embodiment 2

Embodiment 2 of the present invention is hereinafter described.

In Embodiment 2, the distance D between the optical axes of the left and right exchangeable lenses is 200 mm, which is larger than that in Embodiment 1. Therefore, the stereoscopic effect is more exaggerated compared with human sense. Other structures of the apparatus including the exchangeable lenses are exactly the same as those in Embodiment 1.

Figure 4:
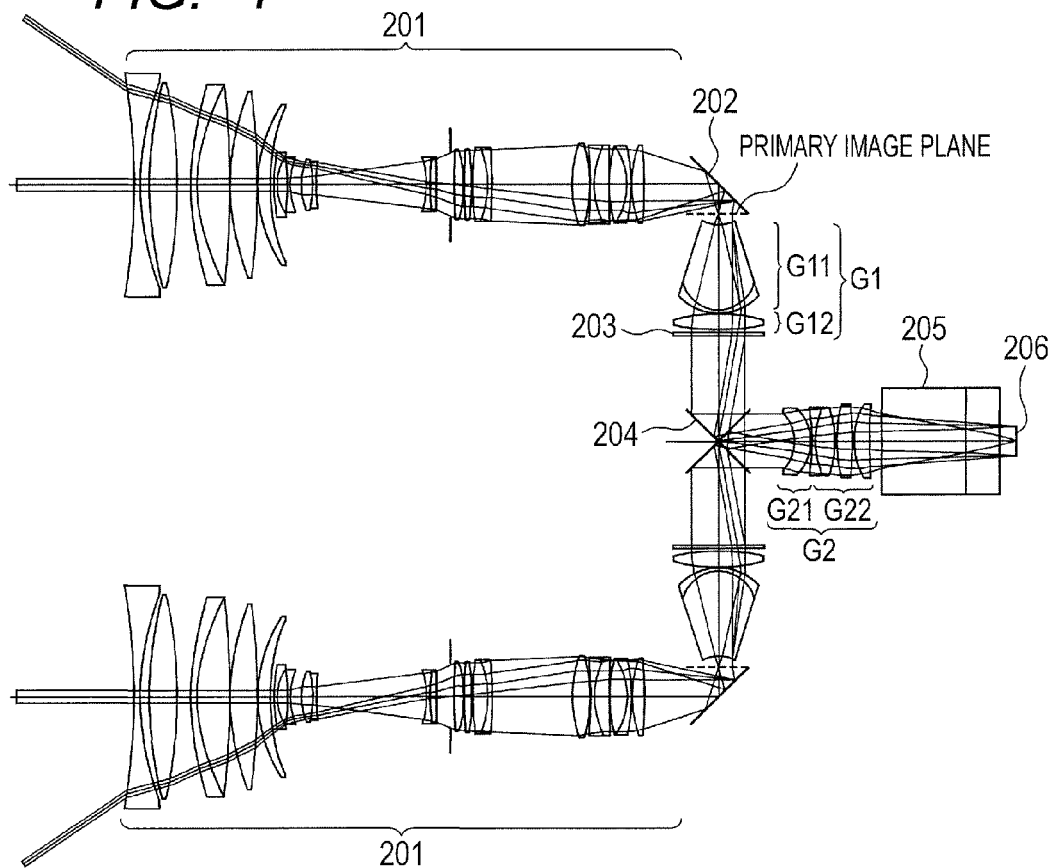
FIG. 4 is an optical path diagram when focusing at infinity at the wide angle end in a lens system according to Embodiment 2 of the present invention.
Figure 5:
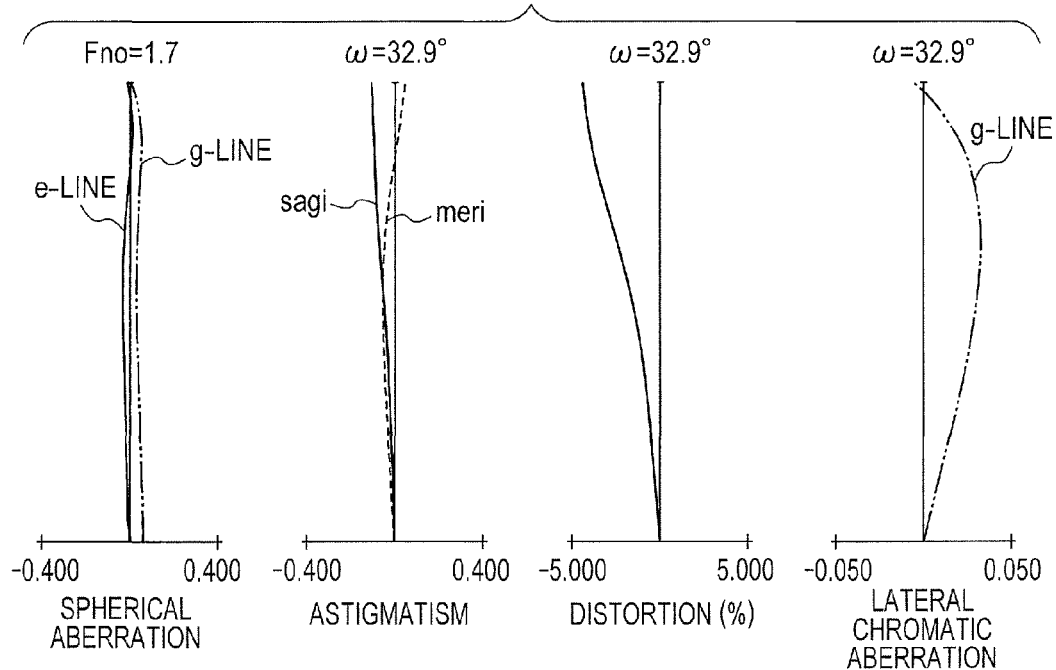
FIG. 5 is an aberration diagram when focusing at 3 meters at the wide angle end in the lens system according to Embodiment 2.

FIG. 4 is an optical path diagram of a lens system according to Embodiment 2 of the present invention (Numerical Embodiment 2) when focusing on an object at infinity at the wide angle end. FIG. 5 is a longitudinal aberration diagram when focusing on an object at a subject distance of 3 meters at the wide angle end according to Embodiment 2. Note that, because the exchangeable lenses are exactly the same as those of Embodiment 1, the aberration diagram at the telephoto end is omitted.

In Numerical Embodiment 2 corresponding to Embodiment 2, the focal lengths of the individual lens units and values of the curvature radius are substituted into the conditional expressions (1) to (3). Then, the values in the field of Embodiment 2 of Table 1 are obtained, and all the conditional expressions are satisfied. In addition, the conditional expressions (1a), (2a), and (3a) defining more preferred value ranges are also satisfied. Thus, Embodiment 2 realizes a compact lens adapter in which the exit pupil position is positioned distant from the image pickup surface while maintaining good optical performance so that a relatively long back focus is secured.

Embodiment 3

Embodiment 3 of the present invention is hereinafter described.

In Embodiment 3, the distance D between the optical axes between the left and right exchangeable lenses is 100 mm, which is smaller than that in Embodiment 1. Therefore, the stereoscopic effect closer to the human sense can be obtained. Other structures of the apparatus including the exchangeable lenses are exactly the same as those in Embodiment 1.

Figure 6:
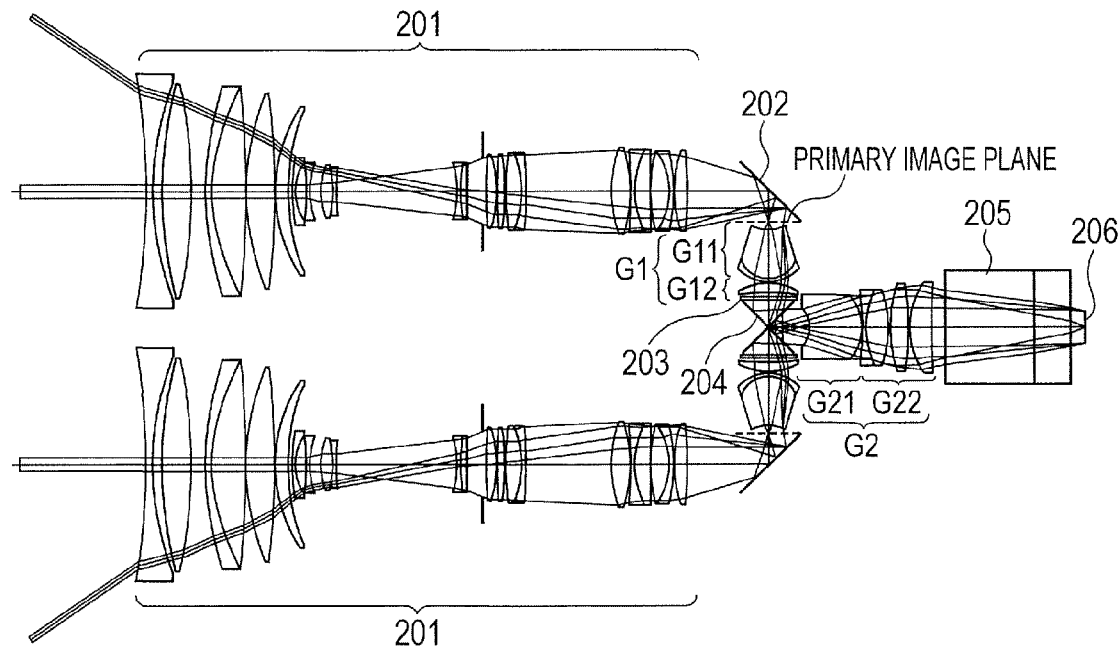
FIG. 6 is an optical path diagram when focusing at infinity at the wide angle end in a lens system according to Embodiment 3 of the present invention.
Figure 7:
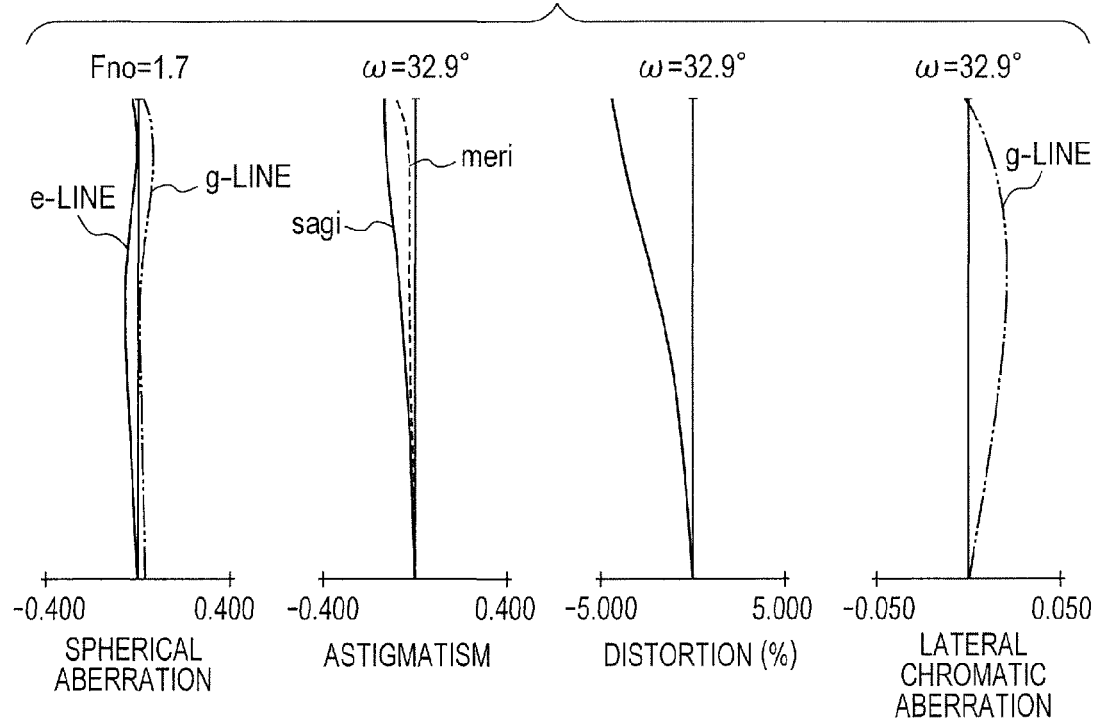
FIG. 7 is an aberration diagram when focusing at 3 meters at the wide angle end in the lens system according to Embodiment 3.

FIG. 6 is an optical path diagram of a lens system according to Embodiment 3 of the present invention (Numerical Embodiment 3) when focusing on an object at infinity at the wide angle end. FIG. 7 is a longitudinal aberration diagram when focusing on an object at a subject distance of 3 meters at the wide angle end according to Embodiment 3. Note that, because the exchangeable lenses are exactly the same as those of Embodiment 1, the aberration diagram at the telephoto end is omitted.

In Numerical Embodiment 3 corresponding to Embodiment 3, the focal lengths of the individual lens units and values of the curvature radius are substituted into the conditional expressions (1) to (3). Then, the values in the field of Embodiment 3 of Table 1 are obtained, and all the conditional expressions are satisfied. In addition, the conditional expressions (1a), (2a), and (3a) defining more preferred value ranges are also satisfied. Thus, Embodiment 3 realizes a compact lens adapter in which the exit pupil position is positioned distant from the image pickup surface while maintaining good optical performance so that a relatively long back focus is secured.

Embodiment 4

Embodiment 4 of the present invention is hereinafter described.

A lens configuration of Embodiment 4 is described. The structures of the first lens unit G1 and the second lens unit G2, and the arrangement order of the lens units G11, G12, G21, and G22 are the same as those in Embodiment 1. Embodiment 4 is different from Embodiment 1 in internal structures of the lens units G11 and G21. The lens unit G11 is a single lens, and the lens unit G21 is formed of a cemented lens including one positive lens and one negative lens. Other basic structures of the apparatus including the exchangeable lenses are the same as those in Embodiment 1.

Figure 8:
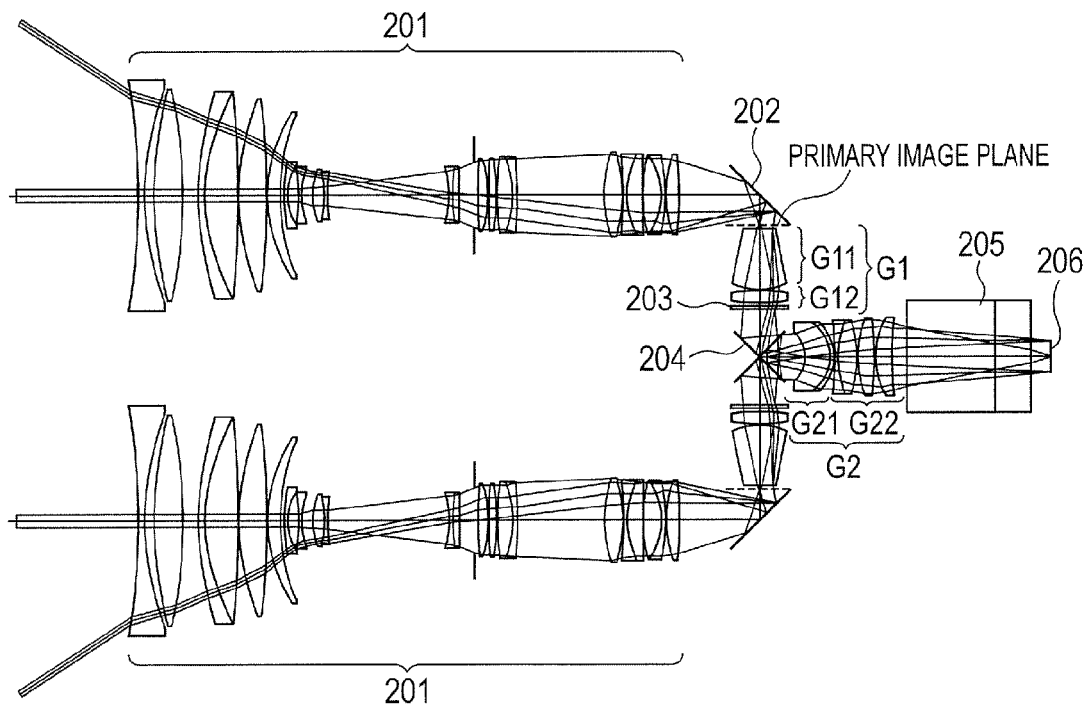
FIG. 8 is an optical path diagram when focusing at infinity at the wide angle end in a lens system according to Embodiment 4 of the present invention.
Figure 9:
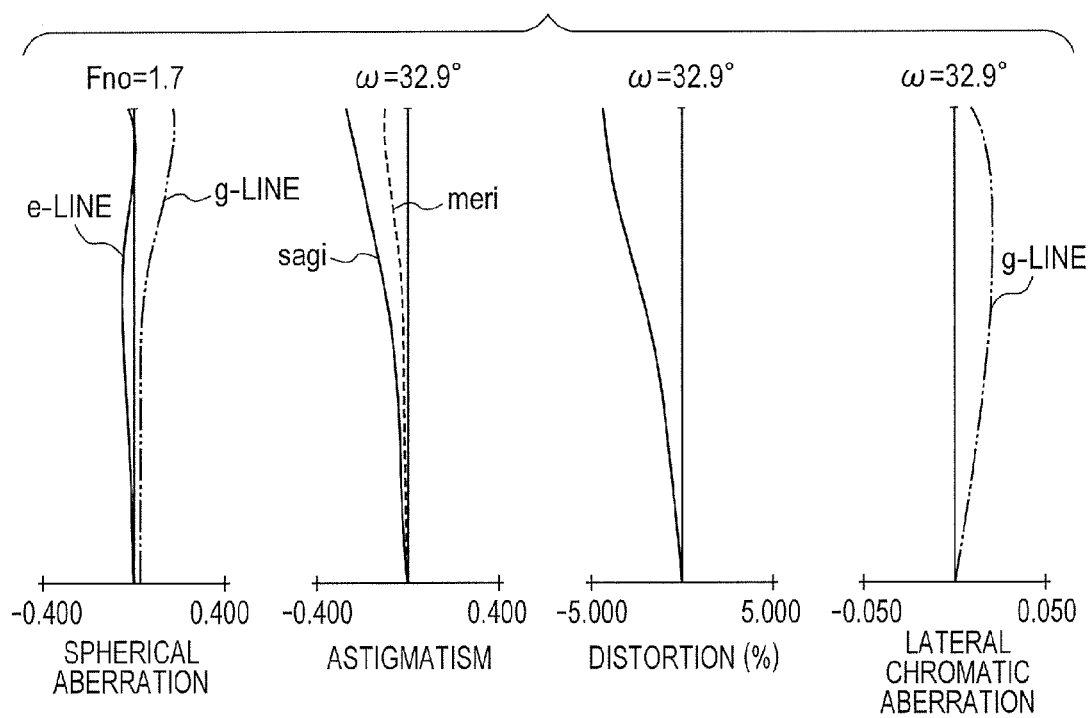
FIG. 9 is an aberration diagram when focusing at 3 meters at the wide angle end in the lens system according to Embodiment 4.

FIG. 8 is an optical path diagram of a lens system according to Embodiment 4 of the present invention (Numerical Embodiment 4) when focusing on an object at infinity at the wide angle end. FIG. 9 is a longitudinal aberration diagram when focusing on an object at a subject distance of 3 meters at the wide angle end according to Embodiment 4. Note that, because the exchangeable lenses are exactly the same as those of Embodiment 1, the aberration diagram at the telephoto end is omitted.

In Numerical Embodiment 4 corresponding to Embodiment 4, the focal lengths of the individual lens units and values of the curvature radius are substituted into the conditional expressions (1) to (3). Then, the values in the field of Embodiment 4 of Table 1 are obtained, and all the conditional expressions are satisfied. In addition, the conditional expressions (1a), (2a), and (3a) defining more preferred value ranges are also satisfied. Thus, Embodiment 4 realizes a compact lens adapter in which the exit pupil position is positioned distant from the image pickup surface while maintaining good optical performance so that a relatively long back focus is secured.

In addition, Embodiment 4 has the same distance between the optical axes of the left and right exchangeable lenses as Embodiment 1, namely D=120 mm.

Numerical Embodiment 1

| Surface data | | | | | |
|---|---|---|---|---|---|
| Surface Number | r | d | nd | vd | Effective diameter |
| 1 | −255.551 | 2.50 | 1.74000 | 31.7 | 83.33 |
| 2 | 116.017 | 3.32 | | | 78.30 |
| 3 | 159.478 | 10.66 | 1.43875 | 95.0 | 78.08 |
| 4 | −169.489 | 5.96 | | | 77.73 |
| 5 | 131.149 | 2.20 | 1.61340 | 44.3 | 76.16 |
| 6 | 75.618 | 0.02 | | | 74.19 |
| 7 | 75.377 | 12.37 | 1.43875 | 95.0 | 74.20 |
| 8 | −525.485 | 0.15 | | | 73.91 |
| 9 | 93.787 | 10.38 | 1.60300 | 65.5 | 70.69 |
| 10 | −299.831 | 0.15 | | | 69.92 |
| 11 | 54.733 | 5.40 | 1.72916 | 54.7 | 60.92 |
| 12 | 92.732 | (Variable) | | | 59.93 |
| 13 | 48.885 | 0.90 | 1.88300 | 40.8 | 24.44 |
| 14 | 17.522 | 4.68 | | | 20.70 |
| 15 | −53.332 | 0.80 | 1.81600 | 46.6 | 20.29 |
| 16 | 25.118 | 4.28 | | | 18.84 |
| 17 | 28.654 | 4.15 | 1.81786 | 23.7 | 18.52 |
| 18 | −53.487 | 0.59 | | | 17.87 |
| 19 | −34.766 | 0.80 | 1.77250 | 49.6 | 17.65 |
| 20 | 88.499 | (Variable) | | | 17.02 |
| 21 | −27.616 | 0.90 | 1.77250 | 49.6 | 17.80 |
| 22 | 43.086 | 2.42 | 1.84666 | 23.9 | 19.30 |
| 23 | −481.564 | (Variable) | | | 19.78 |
| 24 (Stop) | ∞ | 1.10 | | | 24.33 |
| 25 | 231.826 | 3.56 | 1.51742 | 52.4 | 25.37 |
| 26 | −46.618 | 0.20 | | | 25.94 |
| 27 | 168.010 | 3.04 | 1.51742 | 52.4 | 26.79 |
| 28 | −81.919 | 0.20 | | | 27.01 |
| 29 | 69.136 | 6.07 | 1.51742 | 52.4 | 27.20 |
| 30 | −30.903 | 1.30 | 1.81600 | 46.6 | 27.06 |
| 31 | −320.915 | 32.00 | | | 27.41 |
| 32 | 49.972 | 6.30 | 1.48749 | 70.2 | 30.35 |
| 33 | −48.901 | 0.20 | | | 30.11 |
| 34 | −289.282 | 1.40 | 1.83400 | 37.2 | 28.81 |
| 35 | 28.438 | 6.00 | 1.50137 | 56.4 | 27.42 |
| 36 | 782.437 | 0.20 | | | 27.20 |
| 37 | 68.152 | 6.91 | 1.48749 | 70.2 | 27.39 |
| 38 | −25.893 | 1.40 | 1.83400 | 37.2 | 27.32 |
| 39 | −65.266 | 0.20 | | | 28.08 |
| 40 | 40.256 | 4.43 | 1.51112 | 60.5 | 28.10 |
| 41 | −609.030 | 29.82 | | | 29.29 |
| 42 | ∞ | 14.43 | | | 30.00 |
| 43 | −14.264 | 21.17 | 1.49700 | 81.5 | 11.54 |
| 44 | −11.145 | 1.00 | 1.83400 | 37.2 | 19.81 |
| 45 | −15.515 | 0.38 | | | 22.08 |
| 46 | 36.963 | 4.61 | 1.67003 | 47.2 | 23.48 |
| 47 | −99.872 | 1.00 | | | 23.18 |
| 48 | ∞ | 1.00 | 1.51633 | 64.1 | 24.00 |
| 49 | ∞ | 16.42 | | | 24.00 |
| 50 | ∞ | 15.42 | | | 26.00 |
| 51 | −11.766 | 14.63 | 1.56732 | 42.8 | 14.27 |
| 52 | −17.168 | 0.38 | | | 21.50 |
| 53 | −60.733 | 1.00 | 1.80100 | 35.0 | 21.50 |
| 54 | 24.057 | 8.21 | 1.48749 | 70.2 | 22.25 |
| 55 | −35.286 | 0.64 | | | 23.78 |
| 56 | 38.982 | 6.99 | 1.49700 | 81.5 | 25.33 |
| 57 | −95.088 | 0.50 | | | 25.45 |
| 58 | 28.623 | 5.39 | 1.49700 | 81.5 | 25.90 |

-continued

| | | | | | |
|---|---|---|---|---|---|
| 59 | 420.078 | 5.00 | | | 25.24 |
| 60 | ∞ | 33.00 | 1.60859 | 46.4 | 40.00 |
| 61 | ∞ | 13.20 | 1.51680 | 64.2 | 40.00 |
| 62 | ∞ | | | | 40.00 |
| Image plane | ∞ | | | | |

Various data

| | | |
|---|---|---|
| Zoom ratio | 15.00 | |
| Focal length | −8.50 | −127.50 |
| F-number | 1.70 | 2.10 |
| Angle of view | 32.91 | 2.47 |
| Image height | 5.50 | 5.50 |
| Total lens length | 397.72 | 397.72 |
| BF | 4.93 | 4.93 |
| d12 | 0.80 | 44.35 |
| d20 | 44.49 | 6.23 |
| d23 | 6.20 | 0.90 |
| d62 | 4.93 | 4.93 |
| Entrance pupil position | 53.37 | 464.49 |
| Exit pupil position | −184.46 | −184.46 |
| Front principal point position | 44.49 | 251.16 |
| Rear principal point position | 13.43 | 132.43 |

Zoom lens unit data

| Unit | Leading surface | Focal length | Lens structure length | Front principal point position | Rear principal point position |
|---|---|---|---|---|---|
| 1 | 1 | 64.00 | 53.11 | 32.49 | −0.47 |
| 2 | 13 | −14.40 | 16.20 | 2.84 | −9.68 |
| 3 | 21 | −41.00 | 3.32 | −0.17 | −1.99 |
| 4 | 24 | −32.20 | 268.68 | −39.03 | −0.43 |

Numerical Embodiment 2

Surface data

| Surface Number | r | d | nd | vd | Effective diameter |
|---|---|---|---|---|---|
| 1 | −255.551 | 2.50 | 1.74000 | 31.7 | 83.33 |
| 2 | 116.017 | 3.32 | | | 78.30 |
| 3 | 159.478 | 10.66 | 1.43875 | 95.0 | 78.08 |
| 4 | −169.489 | 5.96 | | | 77.73 |
| 5 | 131.149 | 2.20 | 1.61340 | 44.3 | 76.16 |
| 6 | 75.618 | 0.02 | | | 74.19 |
| 7 | 75.377 | 12.37 | 1.43875 | 95.0 | 74.20 |
| 8 | −525.485 | 0.15 | | | 73.91 |
| 9 | 93.787 | 10.38 | 1.60300 | 65.5 | 70.69 |
| 10 | −299.831 | 0.15 | | | 69.92 |
| 11 | 54.733 | 5.40 | 1.72916 | 54.7 | 60.92 |
| 12 | 92.732 | (Variable) | | | 59.93 |
| 13 | 48.885 | 0.90 | 1.88300 | 40.8 | 24.44 |
| 14 | 17.522 | 4.68 | | | 20.70 |
| 15 | −53.332 | 0.80 | 1.81600 | 46.6 | 20.29 |
| 16 | 25.118 | 4.28 | | | 18.84 |
| 17 | 28.654 | 4.15 | 1.81786 | 23.7 | 18.52 |
| 18 | −53.487 | 0.59 | | | 17.87 |
| 19 | −34.766 | 0.80 | 1.77250 | 49.6 | 17.65 |
| 20 | 88.499 | (Variable) | | | 17.02 |
| 21 | −27.616 | 0.90 | 1.77250 | 49.6 | 17.80 |
| 22 | 43.086 | 2.42 | 1.84666 | 23.9 | 19.30 |
| 23 | −481.564 | (Variable) | | | 19.78 |
| 24 (Stop) | ∞ | 1.10 | | | 24.33 |
| 25 | 231.826 | 3.56 | 1.51742 | 52.4 | 25.37 |
| 26 | −46.618 | 0.20 | | | 25.94 |
| 27 | 168.010 | 3.04 | 1.51742 | 52.4 | 26.79 |
| 28 | −81.919 | 0.20 | | | 27.01 |
| 29 | 69.136 | 6.07 | 1.51742 | 52.4 | 27.20 |

-continued

| | | | | | |
|---|---|---|---|---|---|
| 30 | −30.903 | 1.30 | 1.81600 | 46.6 | 27.06 |
| 31 | −320.915 | 32.00 | | | 27.41 |
| 32 | 49.972 | 6.30 | 1.48749 | 70.2 | 30.35 |
| 33 | −48.901 | 0.20 | | | 30.11 |
| 34 | −289.282 | 1.40 | 1.83400 | 37.2 | 28.81 |
| 35 | 28.438 | 6.00 | 1.50137 | 56.4 | 27.42 |
| 36 | 782.437 | 0.20 | | | 27.20 |
| 37 | 68.152 | 6.91 | 1.48749 | 70.2 | 27.39 |
| 38 | −25.893 | 1 40 | 1.83400 | 37.2 | 27.32 |
| 39 | −65.266 | 0.20 | | | 28.08 |
| 40 | 40.256 | 4.43 | 1.51112 | 60.5 | 28.10 |
| 41 | −609.030 | 29.82 | | | 29.28 |
| 42 | ∞ | 15.38 | | | 30.00 |
| 43 | −12.023 | 33.58 | 1.49700 | 81.5 | 11.77 |
| 44 | −14.331 | 1.00 | 1.80100 | 35.0 | 26.73 |
| 45 | −21.712 | 0.38 | | | 30.69 |
| 46 | 64.235 | 6.26 | 1.67003 | 47.2 | 34.60 |
| 47 | −80.635 | 1.00 | | | 34.64 |
| 48 | ∞ | 1.00 | 1.51633 | 64.1 | 35.00 |
| 49 | ∞ | 41.40 | | | 35.00 |
| 50 | ∞ | 30.46 | | | 35.00 |
| 51 | −15.936 | 6.22 | 1.56732 | 42.8 | 21.34 |
| 52 | −18.740 | 0.38 | | | 24.77 |
| 53 | −173.883 | 1.00 | 1.80100 | 35.0 | 24.92 |
| 54 | 32.773 | 7.97 | 1.49700 | 81.5 | 25.24 |
| 55 | −51.196 | 0.64 | | | 26.28 |
| 56 | 69.334 | 6.07 | 1.49700 | 81.5 | 26.86 |
| 57 | −119.395 | 0.50 | | | 26.75 |
| 58 | 29.138 | 6.81 | 1.49700 | 81.5 | 26.07 |
| 59 | 319.216 | 5.00 | | | 24.38 |
| 60 | ∞ | 33.00 | 1.60859 | 46.4 | 40.00 |
| 61 | ∞ | 13.20 | 1.51680 | 64.2 | 40.00 |
| 62 | ∞ | | | | 40.00 |
| Image plane | ∞ | | | | |

Various data

| | | | | | |
|---|---|---|---|---|---|
| Zoom ratio | 15.00 | | | | |
| Focal length | −8.50 | −17.00 | −34.00 | −68.00 | −127.50 |
| F-number | 1.70 | 1.70 | 1.70 | 1.70 | 2.10 |
| Angle of view | 32.91 | 17.93 | 9.19 | 4.62 | 2.47 |
| Image height | 5.50 | 5.50 | 5.50 | 5.50 | 5.50 |
| Total lens length | 446.42 | 446.42 | 446.42 | 446.42 | 446.42 |
| BF | 6.73 | 6.73 | 6.73 | 6.73 | 6.73 |
| d12 | 0.80 | 19.24 | 31.64 | 39.85 | 44.35 |
| d20 | 44.49 | 23.25 | 9.39 | 3.47 | 6.23 |
| d23 | 6.20 | 8.99 | 10.45 | 8.17 | 0.90 |
| d62 | 6.73 | 6.73 | 6.73 | 6.73 | 6.73 |
| Entrance pupil position | 53.37 | 101.62 | 178.60 | 301.93 | 464.49 |
| Exit pupil position | −134.74 | −134.74 | −134.74 | −134.74 | −134.74 |
| Front principal point position | 44.36 | 82.57 | 136.43 | 201.24 | 222.08 |
| Rear principal point position | 15.23 | 23.73 | 40.73 | 74.73 | 134.23 |

Zoom lens unit data

| Unit | Leading surface | Focal length | Lens structure length | Front principal point position | Rear principal point position |
|---|---|---|---|---|---|
| 1 | 1 | 64.00 | 53.11 | 32.49 | −0.47 |
| 2 | 13 | −14.40 | 16.20 | 2.84 | −9.68 |
| 3 | 21 | −41.00 | 3.32 | −0.17 | −1.99 |
| 4 | 24 | −30.17 | 315.58 | −38.74 | 1.70 |

Numerical Embodiment 3

Surface data

| Surface Number | r | d | nd | vd | Effective diameter |
|---|---|---|---|---|---|
| 1 | −255.551 | 2.50 | 1.74000 | 31.7 | 83.33 |
| 2 | 116.017 | 3.32 | | | 78.30 |
| 3 | 159.478 | 10.66 | 1.43875 | 95.0 | 78.08 |
| 4 | −169.489 | 5.96 | | | 77.73 |
| 5 | 131.149 | 2.20 | 1.61340 | 44.3 | 76.16 |
| 6 | 75.618 | 0.02 | | | 74.19 |
| 7 | 75.377 | 12.37 | 1.43875 | 95.0 | 74.20 |
| 8 | −525.485 | 0.15 | | | 73.91 |
| 9 | 93.787 | 10.38 | 1.60300 | 65.5 | 70.69 |
| 10 | −299.831 | 0.15 | | | 69.92 |
| 11 | 54.733 | 5.40 | 1.72916 | 54.7 | 60.92 |
| 12 | 92.732 | (Variable) | | | 59.93 |
| 13 | 48.885 | 0.90 | 1.88300 | 40.8 | 24.44 |
| 14 | 17.522 | 4.68 | | | 20.70 |
| 15 | −53.332 | 0.80 | 1.81600 | 46.6 | 20.29 |
| 16 | 25.118 | 4.28 | | | 18.84 |
| 17 | 28.654 | 4.15 | 1.81786 | 23.7 | 18.52 |
| 18 | −53.487 | 0.59 | | | 17.87 |
| 19 | −34.766 | 0.80 | 1.77250 | 49.6 | 17.65 |
| 20 | 88.499 | (Variable) | | | 17.02 |
| 21 | −27.616 | 0.90 | 1.77250 | 49.6 | 17.80 |
| 22 | 43.086 | 2.42 | 1.84666 | 23.9 | 19.30 |
| 23 | −481.564 | (Variable) | | | 19.78 |
| 24 (Stop) | ∞ | 1.10 | | | 24.33 |
| 25 | 231.826 | 3.56 | 1.51742 | 52.4 | 25.37 |
| 26 | −46.618 | 0.20 | | | 25.94 |
| 27 | 168.010 | 3.04 | 1.51742 | 52.4 | 26.79 |
| 28 | −81.919 | 0.20 | | | 27.01 |
| 29 | 69.136 | 6.07 | 1.51742 | 52.4 | 27.20 |
| 30 | −30.903 | 1.30 | 1.81600 | 46.6 | 27.06 |
| 31 | −320.915 | 32.00 | | | 27.41 |
| 32 | 49.972 | 6.30 | 1.48749 | 70.2 | 30.35 |
| 33 | −48.901 | 0.20 | | | 30.11 |
| 34 | −289.282 | 1.40 | 1.83400 | 37.2 | 28.81 |
| 35 | 28.438 | 6.00 | 1.50137 | 56.4 | 27.42 |
| 36 | 782.437 | 0.20 | | | 27.20 |
| 37 | 68.152 | 6.91 | 1.48749 | 70.2 | 27.39 |
| 38 | −25.893 | 1.40 | 1.83400 | 37.2 | 27.32 |
| 39 | −65.266 | 0.20 | | | 28.08 |
| 40 | 40.256 | 4.43 | 1.51112 | 60.5 | 28.10 |
| 41 | −609.030 | 29.82 | | | 29.29 |
| 42 | ∞ | 13.91 | | | 16.03 |
| 43 | −16.207 | 18.71 | 1.49700 | 81.5 | 11.43 |
| 44 | −9.559 | 1.00 | 1.80100 | 35.0 | 17.79 |
| 45 | −13.224 | 0.38 | | | 20.10 |
| 46 | 21.526 | 4.03 | 1.67003 | 47.2 | 20.67 |
| 47 | 89.773 | 1.00 | | | 19.92 |
| 48 | ∞ | 1.00 | 1.51633 | 64.1 | 20.00 |
| 49 | ∞ | 9.98 | | | 20.00 |
| 50 | ∞ | 15.30 | | | 14.43 |
| 51 | −9.245 | 19.37 | 1.56732 | 42.8 | 12.20 |
| 52 | −17.633 | 0.38 | | | 23.01 |
| 53 | −70.168 | 1.00 | 1.80100 | 35.0 | 23.27 |
| 54 | 27.819 | 8.71 | 1.49700 | 81.5 | 24.46 |
| 55 | −34.941 | 0.64 | | | 26.74 |
| 56 | 45.283 | 6.37 | 1.49700 | 81.5 | 30.62 |
| 57 | −118.908 | 0.50 | | | 31.03 |
| 58 | 28.588 | 8.39 | 1.49700 | 81.5 | 31.65 |
| 59 | 247.237 | 5.00 | | | 30.18 |
| 60 | ∞ | 33.00 | 1.60859 | 46.4 | 40.00 |
| 61 | ∞ | 13.20 | 1.51680 | 64.2 | 40.00 |
| 62 | ∞ | | | | 40.00 |
| Image plane | ∞ | | | | |

Various data

| Zoom ratio | 15.00 | | | | |
|---|---|---|---|---|---|
| Focal length | −8.50 | −17.00 | −34.00 | −68.00 | −127.50 |
| F-number | 1.70 | 1.70 | 1.70 | 1.70 | 2.10 |
| Angle of view | 32.91 | 17.93 | 9.19 | 4.62 | 2.47 |
| Image height | 5.50 | 5.50 | 5.50 | 5.50 | 5.50 |
| Total lens length | 396.70 | 396.70 | 396.70 | 396.70 | 396.70 |

-continued

| | | | | | |
|---|---|---|---|---|---|
| BF | 6.41 | 6.41 | 6.41 | 6.41 | 6.41 |
| d12 | 0.80 | 19.24 | 31.64 | 39.85 | 44.35 |
| d20 | 44.49 | 23.25 | 9.39 | 3.47 | 6.23 |
| d23 | 6.20 | 8.99 | 10.45 | 8.17 | 0.90 |
| d62 | 6.41 | 6.41 | 6.41 | 6.41 | 6.41 |
| Entrance pupil position | 53.37 | 101.62 | 178.60 | 301.93 | 464.49 |
| Exit pupil position | 545.25 | 545.25 | 545.25 | 545.25 | 545.25 |
| Front principal point position | 45.01 | 85.15 | 146.75 | 242.51 | 367.16 |
| Rear principal point position | 14.91 | 23.41 | 40.41 | 74.41 | 133.91 |

Zoom lens unit data

| Unit | Leading surface | Focal length | Lens structure length | Front principal point position | Rear principal point position |
|---|---|---|---|---|---|
| 1 | 1 | 64.00 | 53.11 | 32.49 | −0.47 |
| 2 | 13 | −14.40 | 16.20 | 2.84 | −9.68 |
| 3 | 21 | −41.00 | 3.32 | −0.17 | −1.99 |
| 4 | 24 | −43.99 | 266.17 | −40.71 | −0.91 |

Numerical Embodiment 4

Surface data

| Surface Number | r | d | nd | vd | Effective diameter |
|---|---|---|---|---|---|
| 1 | −255.551 | 2.50 | 1.74000 | 31.7 | 83.33 |
| 2 | 116.017 | 3.32 | | | 78.30 |
| 3 | 159.478 | 10.66 | 1.43875 | 95.0 | 78.08 |
| 4 | −169.489 | 5.96 | | | 77.73 |
| 5 | 131.149 | 2.20 | 1.61340 | 44.3 | 76.16 |
| 6 | 75.618 | 0.02 | | | 74.19 |
| 7 | 75.377 | 12.37 | 1.43875 | 95.0 | 74.20 |
| 8 | −525.485 | 0.15 | | | 73.91 |
| 9 | 93.787 | 10.38 | 1.60300 | 65.5 | 70.69 |
| 10 | −299.831 | 0.15 | | | 69.92 |
| 11 | 54.733 | 5.40 | 1.72916 | 54.7 | 60.92 |
| 12 | 92.732 | (Variable) | | | 59.93 |
| 13 | 48.885 | 0.90 | 1.88300 | 40.8 | 24.44 |
| 14 | 17.522 | 4.68 | | | 20.70 |
| 15 | −53.332 | 0.80 | 1.81600 | 46.6 | 20.29 |
| 16 | 25.118 | 4.28 | | | 18.84 |
| 17 | 28.654 | 4.15 | 1.81786 | 23.7 | 18.52 |
| 18 | −53.487 | 0.59 | | | 17.87 |
| 19 | −34.766 | 0.80 | 1.77250 | 49.6 | 17.65 |
| 20 | 88.499 | (Variable) | | | 17.02 |
| 21 | −27.616 | 0.90 | 1.77250 | 49.6 | 17.80 |
| 22 | 43.086 | 2.42 | 1.84666 | 23.9 | 19.30 |
| 23 | −481.564 | (Variable) | | | 19.78 |
| 24 (Stop) | ∞ | 1.10 | | | 24.33 |
| 25 | 231.826 | 3.56 | 1.51742 | 52.4 | 25.37 |
| 26 | −46.618 | 0.20 | | | 25.94 |
| 27 | 168.010 | 3.04 | 1.51742 | 52.4 | 26.79 |
| 28 | −81.919 | 0.20 | | | 27.01 |
| 29 | 69.136 | 6.07 | 1.51742 | 52.4 | 27.20 |
| 30 | −30.903 | 1.30 | 1.81600 | 46.6 | 27.06 |
| 31 | −320.915 | 32.00 | | | 27.41 |
| 32 | 49.972 | 6.30 | 1.48749 | 70.2 | 30.35 |
| 33 | −48.901 | 0.20 | | | 30.11 |
| 34 | −289.282 | 1.40 | 1.83400 | 37.2 | 28.81 |
| 35 | 28.438 | 6.00 | 1.50137 | 56.4 | 27.42 |
| 36 | 782.437 | 0.20 | | | 27.20 |
| 37 | 68.152 | 6.91 | 1.48749 | 70.2 | 27.39 |
| 38 | −25.893 | 1.40 | 1.83400 | 37.2 | 27.32 |
| 39 | −65.266 | 0.20 | | | 28.08 |
| 40 | 40.256 | 4.43 | 1.51112 | 60.5 | 28.10 |
| 41 | −609.030 | 29.82 | | | 29.29 |
| 42 | ∞ | 13.08 | | | 30.00 |
| 43 | −21.218 | 22.05 | 1.49700 | 81.5 | 11.22 |

-continued

| | | | | | |
|---|---|---|---|---|---|
| 44 | −21.700 | 0.38 | | | 19.44 |
| 45 | 84.055 | 4.74 | 1.69680 | 55.5 | 19.82 |
| 46 | −76.739 | 1.00 | | | 19.72 |
| 47 | ∞ | 1.00 | 1.51633 | 64.1 | 20.00 |
| 48 | ∞ | 17.72 | | | 20.00 |
| 49 | ∞ | 16.85 | | | 15.23 |
| 50 | −13.781 | 9.70 | 1.54814 | 45.8 | 17.75 |
| 51 | −13.443 | 1.00 | 1.71736 | 29.5 | 22.39 |
| 52 | −16.951 | 0.38 | | | 24.06 |
| 53 | −368.923 | 1.00 | 1.80100 | 35.0 | 24.82 |
| 54 | 28.478 | 7.55 | 1.48749 | 70.2 | 25.29 |
| 55 | −48.480 | 0.64 | | | 26.30 |
| 56 | 42.309 | 5.77 | 1.49700 | 81.5 | 27.60 |
| 57 | −102.371 | 0.50 | | | 27.46 |
| 58 | 32.789 | 6.49 | 1.49700 | 81.5 | 26.54 |
| 59 | 276.703 | 5.00 | | | 24.82 |
| 60 | ∞ | 33.00 | 1.60859 | 46.4 | 40.00 |
| 61 | ∞ | 13.20 | 1.51680 | 64.2 | 40.00 |
| 62 | ∞ | | | | 40.0 |
| Image plane | ∞ | | | | |

Various data

| | | | | | |
|---|---|---|---|---|---|
| Zoom ratio | 15.00 | | | | |
| Focal length | −8.50 | −17.00 | −34.00 | −68.00 | −127.50 |
| F-number | 1.70 | 1.70 | 1.70 | 1.70 | 2.10 |
| Angle of view | 32.91 | 17.93 | 9.19 | 4.62 | 2.47 |
| Image height | 5.50 | 5.50 | 5.50 | 5.50 | 5.50 |
| Total lens length | 396.77 | 396.77 | 396.77 | 396.77 | 396.77 |
| BF | 7.28 | 7.28 | 7.28 | 7.28 | 7.28 |
| d12 | 0.80 | 19.24 | 31.64 | 39.85 | 44.35 |
| d20 | 44.49 | 23.25 | 9.39 | 3.47 | 6.23 |
| d23 | 6.20 | 8.99 | 10.45 | 8.17 | 0.90 |
| d62 | 7.28 | 7.28 | 7.28 | 7.28 | 7.28 |
| Entrance pupil position | 53.37 | 101.62 | 178.60 | 301.93 | 464.49 |
| Exit pupil position | −71.94 | −71.94 | −71.94 | −71.94 | −71.94 |
| Front principal point position | 43.96 | 80.97 | 130.01 | 175.56 | 131.78 |
| Rear principal point position | 15.78 | 24.28 | 41.28 | 75.28 | 134.78 |

Zoom lens unit data

| Unit | Leading surface | Focal length | Lens structure length | Front principal point position | Rear principal point position |
|---|---|---|---|---|---|
| 1 | 1 | 64.00 | 53.11 | 32.49 | −0.47 |
| 2 | 13 | −14.40 | 16.20 | 2.84 | −9.68 |
| 3 | 21 | −41.00 | 3.32 | −0.17 | −1.99 |
| 4 | 24 | −25.24 | 265.38 | −38.04 | −3.08 |

TABLE 1

| Conditional Expression | Embodiment | | | |
|---|---|---|---|---|
| | 1 | 2 | 3 | 4 |
| (1) | 1.03 | 1.03 | 1.01 | 1.20 |
| (2) | 0.04 | 0.29 | −0.10 | 0.01 |
| (3) | 0.19 | 0.08 | 0.31 | 0.10 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-251462, filed Nov. 17, 2011, which is hereby incorporated by reference herein in its entirety.

What is claimed is:

1. An optical apparatus used for a 3D image pickup apparatus for taking two subject images having a disparity by using two lens apparatuses, each of which is directly connectable to an image pickup apparatus to take a subject image, and one image pickup apparatus, the optical apparatus comprising:
   a first lens attaching unit for attaching a first lens apparatus in a detachable manner;
   a second lens attaching unit for attaching a second lens apparatus in a detachable manner;
   a camera attaching unit for attaching the image pickup apparatus in a detachable manner, the image pickup apparatus including an image pickup portion; and
   a switch unit for alternately switching light rays from the first lens apparatus and the second lens apparatus in a time division manner to guide the light ray to the image pickup apparatus in a state that the first lens apparatus, the second lens apparatus and the image pickup apparatus are connected to the optical apparatus, wherein intermediate images of a subject are formed in the optical apparatus by the first lens apparatus and the second lens apparatus.

2. The optical apparatus according to claim 1, comprising, in order from an object side: first reflective members and first lens units having a positive refractive power disposed respectively for the light rays from the first lens apparatus and the second lens apparatus; a second reflective member for deflecting the light rays from the first lens apparatus and the second lens apparatus so that the deflected light rays have the same optical axis; and a second lens unit having a positive refractive power, wherein the intermediate images of the subject by the first lens apparatus and the second lens apparatus are positioned between the first reflective member and the first lens unit.

3. The optical apparatus according to claim 1, comprising, in order from an object side: first reflective members and first lens units having a positive refractive power disposed respectively for the light rays from the first lens apparatus and the second lens apparatus; a second reflective member for deflecting the light rays from the first lens apparatus and the second lens apparatus so that the deflected light rays have the same optical axis; and a second lens unit having a positive refractive power, wherein: the first lens unit includes, in order from the object side, a G11 unit formed of one of a single lens and a cemented lens including at least one positive lens and at least one negative lens, and a G12 unit having a positive refractive power; the second lens unit includes, in order from the object side, a G21 unit formed of one of a single lens and a cemented lens including at least one positive lens and at least one negative lens, and a G22 unit having a positive refractive power; and at least one of the following expressions is satisfied: $0.90 < f1/f2 < 1.30$; $-0.20 < 1/SF11 < 0.40$; and $0.00 < 1/SF21 < 0.40$, where f1 represents a focal length of the first lens unit, f2 represents a focal length of the second lens unit, SF11 and SF21 represent shape factors of the G11 unit and the G21 unit, and the shape factor of a lens unit is defined by $(R2+R1)/(R2-R1)$ in which R1 represents a curvature radius of an optical surface closest to the object side in the lens unit, and R2 represents a curvature radius of an optical surface closest to the image side in the lens unit.

4. The optical apparatus according to claim 3, wherein the switch unit is disposed closer to the object side with respect to the second reflective member.

5. The optical apparatus according to claim 1, further comprising a convergence angle changing mechanism for changing a convergence angle between two exchangeable lenses, wherein the convergence angle changing mechanism includes: a drive unit for moving at least one lens of the first lens unit in a plane perpendicular to an optical axis; and a controller for controlling the drive unit to move the lenses of the first lens units of the first lens apparatus and the second lens apparatus by the same amount in opposite directions with respect to an optical axis direction so that an optical axis of the first lens apparatus and an optical axis of the second lens apparatus are tilted in the opposite directions to each other in a plane including the optical axis of the first lens apparatus and the optical axis of the second lens apparatus.

6. The optical apparatus according to claim 1, further comprising a unit for outputting switch timing for the switch unit.

7. A 3D image pickup apparatus, comprising an optical apparatus used for a 3D image pickup apparatus for taking two subject images having a disparity by using two lens apparatuses, each of which is directly connectable to an image pickup apparatus to take a subject image, and one image pickup apparatus, the optical apparatus comprising:
   a first lens attaching unit for attaching a first lens apparatus in a detachable manner;
   a second lens attaching unit for attaching a second lens apparatus in a detachable manner;
   a camera attaching unit for attaching the image pickup apparatus in a detachable manner, the image pickup apparatus including an image pickup portion; and
   a switch unit for alternately switching light rays from the first lens apparatus and the second lens apparatus in a time division manner to guide the light ray to the image pickup apparatus in a state that the first lens apparatus, the second lens apparatus and the image pickup apparatus are connected to the optical apparatus,
   wherein intermediate images of a subject are formed in the optical apparatus by the first lens apparatus and the second lens apparatus.

* * * * *